United States Patent

Ross et al.

[11] 3,908,157
[45] Sept. 23, 1975

[54] ELECTROLYTIC CAPACITOR CONSTRUCTION AND SYSTEM

[75] Inventors: Sidney D. Ross; Franz S. Dunkl, both of Williamstown, Mass.; Clinton E. Hutchins, Pownal, Vt.

[73] Assignee: Sprague Electric Company, North Adams, Mass.

[22] Filed: Nov. 8, 1974

[21] Appl. No.: 522,200

[52] U.S. Cl. .............................. 317/230; 317/258
[51] Int. Cl.² ........................................ H01G 9/02
[58] Field of Search ............................ 317/258, 230

[56] References Cited
UNITED STATES PATENTS

| | | |
|---|---|---|
| 2,994,809 | 8/1961 | Jenny et al .......................... 317/230 |
| 3,619,743 | 11/1971 | Ferrante ............................ 317/258 |
| 3,724,043 | 3/1973 | Eustance ........................... 317/258 |
| 3,731,130 | 5/1973 | Dutta ................................. 317/258 |
| 3,761,772 | 9/1973 | Suzuki et al. ...................... 317/258 |
| R27,824 | 11/1973 | Cox .................................... 317/258 |

*Primary Examiner*—John Kominski
*Attorney, Agent, or Firm*—Connolly and Hutz

[57] ABSTRACT

In an electrolytic capacitor the electrodes are separated by spacer material made of porous polypropylene film having an electrical porosity which results in lower equivalent series resistance, particularly at low temperatures. The electrolytes associated with the porous polypropylene are those having as a solvent, 2-methoxy-proprionitride, tri-n-butylphosphate, N-methylpyrrolidone, hexamethylphosphortriamide, butylcellosolve, and N,N,-dimethylformamide.

3 Claims, 1 Drawing Figure

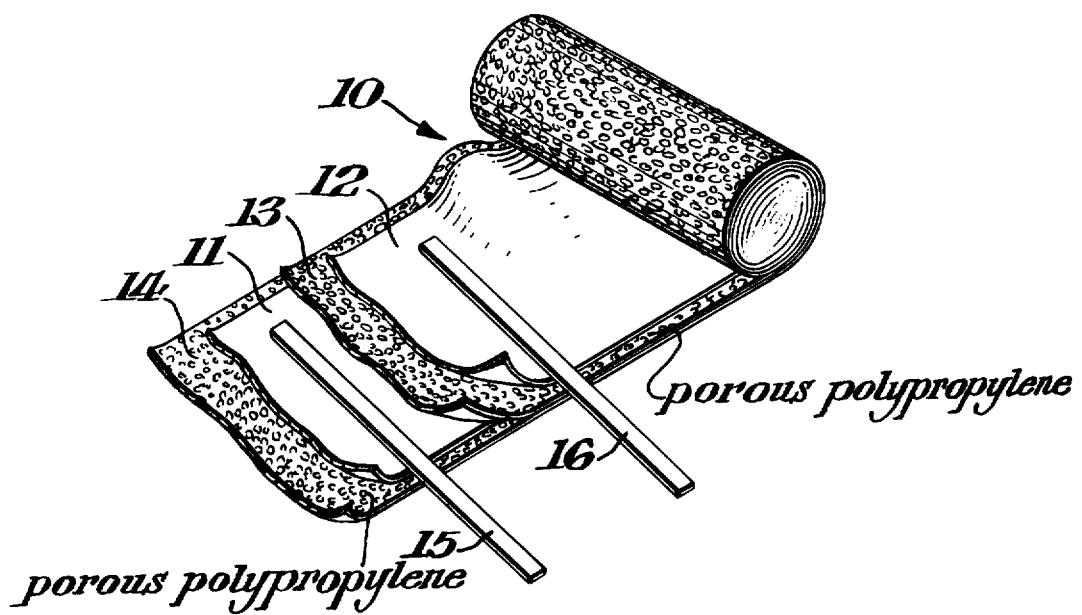

ELECTROLYTIC CAPACITOR CONSTRUCTION AND SYSTEM

BACKGROUND OF THE INVENTION

This invention relates to an improved electrolytic capacitor construction and improved systems in electrolytic capacitors. More particularly it relates to an improved spacer and its coaction with capacitor electrolytes.

The prior art electrolytic capacitors have as a conventional construction an anode foil, a cathode foil and spacers between the anode and cathode holding them apart when they are rolled into a convolutely wound body. The spacer is porous so that the capacitor electrolyte impregnated therein in combination with the spacer fills the space between the anode and cathode. Equivalent series resistance (ESR) in an electrolytic capacitor is an important factor in the operation of the capacitor and ultimately in its usefulness. The spacer in an electrolytic capacitor contributes to the total electrical resistance between the anode and cathode.

It is an object of this invention to provide an electrolytic capacitor having improved electrical characteristics.

It is a further object to provide a capacitor having reduced resistivity.

SUMMARY OF THE INVENTION

An electrolytic capacitor contains as a spacer between the two electrodes a material which contains porous polypropylene film and with an electrolyte impregnated in the spacer provides an improved electrical porosity. The capacitor containing polypropylene spacer and the capacitor electrolyte has excellent equivalent series resistance and equivalent series resistance-to-temperature change characteristics.

A feature of this invention involves the interaction in an electrolytic capacitor with a porous polypropylene spacer and an electrolyte having a solvent of the group tri-n-butylphosphate, N-methylpyrrolidone, hexamethylphosphortriamide, butylcellosolve, dimethylformamide (hereinafter referred to as DMF), 2-methoxypropionitrile and propylene carbonate.

BRIEF DESCRIPTION OF THE DRAWING

The Figure is a perspective view of a capacitor partially unwound.

DETAILED DESCRIPTION OF THE INVENTION

In the Figure a capacitor 10 is shown partially unrolled and an anode 11 and a cathode 12 are shown separated by a pair of spacers 13 and 14 which according to this invention are porous polypropylene film. The cathode 12 is made of a suitable conductive material and the anode 11 is made of a valve metal, preferably aluminum or tantalum. Tabs 15 and 16 are connected to the anode 11 and cathode 12 respectively. The spacers 13 and 14 are impregnated with an electrolyte conductive system described in greater detail below. Tabs 15 and 16 are attached to the anode 11 and cathode 12 respectively as terminals.

The effectiveness of the materials of this invention in electrolytic capacitors was determined by constructing rolled aluminum foil capacitor sections as described and illustrated above and containing appropriate spacer materials including a polypropylene porous film as a spacer and an electrolyte having a solvent of this invention.

In one method of preparing a capacitor the rolled aluminum foil section with the porous polypropylene spacer is impregnated with an electrolyte of 0.1 M diisopropylammonium borodi-2,3-naphthalenediolate in DMF solution.

In these units the ESR measured at various temperatures, the capacitance was measured at various temperatures, the impedance was measured at various frequencies and the leakage current was measured.

Electrical porosity of the spacer in an electrolytic capacitor is a factor in the internal electrical resistivity of the capacitor, as described in Electrochemical Technology Vol. 6, No. 5–6, pp. 172–178. The spacer in an electrolytic capacitor constributes to the total electrical resistance between anode and cathode. Whitl the shape and size of the pores have an effect upon the amount of electrical resistance, other properties of the spacer are influential as well as the type of electrolyte solution and its resistivity. A calculation of common porosity, a percentage of pore volume, is not a dependable and accurate indication of the relationship between a spacer and capacitor characteristics. Electrical porosity of an impregnated spacer in a capacitor can be defined as calculated by the following formula While $$\text{Electrical porosity} = \frac{100R}{R+\Delta R} = \%P$$

where $R$ is the resistance of the electrolyte and $\Delta R$ is the resistance of the spacer.

The following examples of this invention relate to various specific embodiments thereof and are not set forth for the purpose of illustration only and are not intended to be limitative.

EXAMPLE Ia

Electrolytic capacitors were made up consisting of a 3 mil thick aluminum foil of 99.9% purity, electrochemically etched and thereafter formed in aqueous sodium phosphate solution to 40 volts, and a 2 mil unformed etched aluminum foil as the cathode, and a one-mil thick microporous polypropylene film, sold under the trademark Celgard of Celanese Corp., between the formed anode and formed cathode. An electrolyte consisting of 0.1 M diisopropylammonium borodi-2, 3-naphthalene-diolate in DMF solution was introduced into the above described capacitors at 25°C by conventional technique.

EXAMPLE Ib

Electrolytic capacitors were made up with the etched and formed anode foil and the unformed cathode foil set forth in Example Ia and two layers of ½ mil thick kraft paper spacer between the formed anode and formed cathode. The electrolyte set forth above in Example Ia was impregnated in the capacitors by the technique and at the temperature used for impregnation of the capacitors of Example Ia.

The units produced in Examples Ia and Ib had a capacitance of 2000 µf and a voltage rating of 20 vdc.

When tested at room temperature (25°C) the capacitors of examples Ia and Ib gave the characteristics of capacitance, equivalent series resistance and leakage at 20V shown in Table I.

Table I

| Capacitor | Cap µf | ESR ohms | Leakage at 20V µa |
|---|---|---|---|
| polypropylene spacer | 2,157 | 0.048 | 42 |
| | 2,220 | 0.040 | 38 |
| | 2,232 | 0.041 | 37 |
| | 2,192 | 0.046 | 40 |
| | 2,163 | 0.050 | 42 |
| | 2,172 | 0.044 | 55 |
| kraft paper spacer | 2,348 | 0.044 | 28 |
| | 2,345 | 0.044 | 15 |
| | 2,357 | 0.047 | 22 |
| | 2,319 | 0.045 | 29 |
| | 2,322 | 0.045 | 20 |
| | 2,342 | 0.044 | 22 |

The initial characteristics of the capacitors of Examples Ia and Ib are comparable.

The capacitors of Examples Ia and Ib were tested for the capacitance versus temperature characteristic and the average of the measurements shown in Table II.

Table II

| | Temperature °C | | | |
|---|---|---|---|---|
| | 25 | −20 | −40 | −55 |
| Capacitance Ratios Kraft paper spacer | 1.00 | .97 | .88 | .87 |
| Microporous polypropylene spacer | 1.00 | .98 | .96 | .94 |

The control units with kraft paper lost a larger amount of capacitance at temperatures below room temperature than the units with microporous polypropylene spacer.

The capacitors of Examples Ia and Ib were shelf tested at 105°C and tested at 240 hours at 1,000 hours and at 1,500 hours and a summary of the results showing average of measurements is set forth in Table III.

Table III

105°C Life Test Summary
Avg. Values—120 Hz

| Capacitor | Time | Cap | RC | DCL | ESR | %ΔC | ESR Ratio |
|---|---|---|---|---|---|---|---|
| Kraft paper spacer | 0 hours | 2339 | 103 | 23.µa | .044Ω | — | — |
| | 240 hours | 2311 | 81 | 3.3 | .035 | −1.2 | 0.80 |
| | 1K hours | 2288 | 79 | 3.7 | .034 | −2.2 | 0.77 |
| | 1500 | 2268 | 74 | 10.8 | .033 | −3.0 | 0.75 |
| polypropylene spacer | 0 hours | 2189 | 98 | 42.µa | .045Ω | — | — |
| | 240 hours | 2201 | 98 | 5.2 | .045 | 0.55 | 1.00 |
| | 1K hours | 2246 | 59 | 4.1 | .026 | 2.60 | 0.58 |
| | 1500 | 2251 | 51 | 5.4 | .023 | 2.80 | 0.51 |

The units of this invention were observed to have superior equivalent series resistance characteristics after the life test.

EXAMPLE IIa

Electrolytic capacitors were made up consisting of a 3 mil thick aluminum foil of 99.9% purity, electrochemically etched and thereafter formed in aqueous Na phosphate solution to 40 volts and a 2 mil uniformed, etched aluminum foil as the cathode, and a one-mil thick layer of melt blown polypropylene sold under the trademark Polyweb of Riegel Products Corp., between the formed anode and unformed cathode. An electrolyte as set forth in Example Ia was introduced into the above described capacitors at 25°C by a conventional technique.

EXAMPLE IIb

Electrolytic capacitors were made up with the etched and formed anode foil and the unformed cathode foil set forth in Example I and two layers of ½ mil thick kraft paper spacer between the formed anode and unformed cathode. The electrolyte as set forth in Example IIa was impregnated in the capacitors by the technique and at the temperature referred to above in the preparation of the capacitors in Example IIa.

The impedance versus temperature measurements for the capacitors of Examples IIa and IIb are shown in Table IV.

It has been observed that there is a great difference between the units of the invention and of the prior art in ESR, particularly at lower temperatures.

EXAMPLE IIIa

Electrolytic capacitors were made up consisting of a 3 mil thick aluminum foil of 99.9% purity, electro-

Table IV

| | Temperature °C | | | | |
|---|---|---|---|---|---|
| | −40.5 | −16.5 | 24 | 66 | 85 |
| Kraft paper impedance | .26 | .105 | .04 | .035 | .035 |
| Polypropylene spacer impedance | .105 | .07 | .035 | .025 | .03 | chemically etched and thereafter formed in aqueous Na phosphate solution to 40 volts and a 2 mil unformed, etched aluminum foil as the cathode, and a 1.3 mil thick porous polypropylene layer sold under the trademark Delnet of Hercules, Inc., between the formed anode and unformed cathode. An electrolyte as set forth in the previous examples was introduced into the above described capacitors at 25°C by a conventional technique.

EXAMPLE IIIb

Electrolytic capacitors were made up with the etched and formed anode foil and the unformed cathode foil set forth in Example I and two layers of ½ mil thick kraft paper spacer between the formed anode and unformed cathode. The electrolyte as set forth in Example IIIa was impregnated in the capacitors by the technique and at the temperature referred to in Example IIIa.

When tested at room temperature (25°C) the capacitors of Examples IIIa and IIIb gave the characteristics of capacitance, equivalent series resistance and leakage at 20V shown in Table V.

Table V

| | Initial Electrical Measurements Delnet — IIIa | | |
|---|---|---|---|
| | Cap μf | ESR | Leakage at 20V μa |
| | 3280 | 0.035 | 18 |
| | 3234 | 0.034 | 12 |
| | 3228 | 0.034 | 10 |
| | 3207 | 0.033 | 16 |
| | 3243 | 0.033 | 10 |
| Ave. | 3235 | 0.034 | 13 |
| | Kraft — IIIb | | |
| | 3296 | 0.049 | 12 |
| | 3215 | 0.048 | 12 |
| | 3236 | 0.047 | 16 |
| | 3267 | 0.047 | 10 |
| | 3296 | 0.049 | 10 |
| Ave. | 3262 | 0.048 | 12 |

The ESR of the Delnet units is considerably lower than the Kraft units.

The capacitors of Examples IIIa and IIIb were tested for the capacitance versus temperature characteristic and the average of the measurements shown in Table VI.

Table VI

| | Temperature °C | | | |
|---|---|---|---|---|
| Capacitance Ratios | 95 | 25 | −21.5 | −42 |
| Kraft paper spacer | 1.09 | 1.00 | .98 | .93 |
| polypropylene spacer | 1.09 | 1.00 | 1.01 | .98 |

The units with Kraft paper lost a larger amount of capacitance at temperatures below room temperature than the units with porous polypropylene spacer.

The comparison of the ESR in ohms at 120 Hz versus temperature for the capacitors of Examples IIIa and IIIb is set forth in Table VII.

Table VII

| | Temperature in °C | | | |
|---|---|---|---|---|
| ESR | 80 | 24 | −40 | −55 |
| Kraft paper | 3.2 | 4.6 | 21.5 | 47 |
| Delnet spacer | 3 | 2.9 | 4.4 | 5.8 |

At −55°C the ESR of the Kraft units is nearly 10 times that of the capacitors of this invention.

EXAMPLE IV

The electrical porosity of 0.9 mil Celgard and 0.5 mil Benares paper was compared by measurements with various solvents in solutions made up of 100 g solvent and 3.2 g 2,3-naphthalene diol, 016 g boric acid and 1.0 g diisopropylamine. The resistivities and electrical porosities observed for the solvent and spacer combinations are set forth in Table VIII.

Table VIII

| | ohm cm | %P 0.9 mil Celgard | %P 0.5 mil Benares |
|---|---|---|---|
| Tri-n-butylphosphate | 6250 | 17.2 | 0.28 |
| N-methylpyrrolidone | 855 | 19.8 | 3.7 |
| Hexamethyl phosphortriamide | 1500 | 15.2 | 0.23 |
| Butylcellosolve | 8200 | 18.2 | 0.31 |
| DMF | 380 | 25.7 | 6.2 |
| Butyrolactone | 582 | 0.23 | 0.24 |
| Glycol | 800 | 0.4 | 3.9 |

Further comparative measurements were made with solvents in solutions of 100 g solvent and 3 g tributylammonium picrate. The resistivities and electrical porosities observed for the solvent and spacer combinations are set forth in Table IX.

Table IX

| | | | |
|---|---|---|---|
| 3-Methoxypropionitrile | 1220 | 19.6 | 4.3 |
| Propylene carbonate | 1240 | 3.3 | 0.37 |

In general suitable solvents are low boiling point amides, lactams, phosphate esters and amides, lower ether alcohols and lower ether nitriles.

In summary, in the capacitor construction of this invention, a porous spacer of polypropylene sheet impregnated with an electrolyte is sandwiched between capacitor electrodes and provides desired electrical properties including stable equivalent series resistance under temperature change in the capacitor. Various advantages of this spacer and advantages provided capacitors by the use of this spacer have been indicated above.

The spacer of this invention with the indicated electrolyte systems provides desired electrical porosity. The combination of the spacer of polypropylene with electrolyte solvent of the indicated group provide electrical porosity of at least 14. Electrical porosities calculated according to the formula set forth above are set forth in Table X.

Table X

Electrical Porosity Determination:

| | Thickness mil | %P DMF electrolyte | Glycol |
|---|---|---|---|
| Riegel Polyweb | *1.5 | 19.1 | 1.0 |
| (melt blown polypropylene) | **1.5 | 16.8 | 14.3 |
| Celanese Celgard | *1.0 | 17.0 | |
| (micro porous polypropylene fabric) | **1.0 | 25.7 | 0.4 |
| Kendall (nonwoven polypropylene fabric) | 1.0 | 29.3 | 22.2 |
| Hercules, Delnet (continuous polypropylene filament net) | 1.3 | 34 | 37 |
| Kraft paper | 0.5 | 4.9 | 5.2 |
| Benares paper | 1.0 | 6.2 | 5.5 |

*without wetting agent
**with wetting agent, such as anionic oxyester

While certain embodiments are shown and described above, it is to be understood that this invention is capable of modifications, such as changes in capacitor construction, without departure from the scope as defined by the claims.

What is claimed is:
1. In an electrolytic capacitor having a first and second electrode and a combination separating the electrodes of a spacer of porous polypropylene and an electrolyte impregnated in the spacer having an electrolyte solvent of the class consisting of low boiling point amides, lactams, phosphate esters, phosphonamides, ether alcohols, and ether nitriles.

2. In an electrolytic capacitor having a first and second electrode and a combination separating the electrodes of a spacer of porous polypropylene and an electrolyte impregnated in the spacer having an electrolyte solvent of the class consisting of tri-n-butylphosphate, N-methylpyrrolidone, hexamethylphosphortriamide, butylcellosolve, N,N-dimethylformamide, and 2-methoxypropionitrile, said combination having an electrical porosity above 14 and thereby providing to said capacitor a stable ESR-to-temperature change characteristic.

3. An electrolytic capacitor as claimed in claim 2 wherein the porous polypropylene is a microporous polypropylene film.

* * * * *

UNITED STATES PATENT OFFICE
CERTIFICATE OF CORRECTION

PATENT NO. : 3,908,157
DATED : September 23, 1975
INVENTOR(S) : Sidney D. Ross et al It is certified that error appears in the above-identified patent and that said Letters Patent are hereby corrected as shown below:

Column 2, line 16, correct the spelling of -- contributes --
Column 2, line 17, correct the spelling of -- While --
Column 2, line 26, after "formula" delete "While"
Column 2, line 35, after "are" delete "not"
Column 4, line 1, change "uni-" to -- un- --
Column 6, line 15, after "solutions" insert -- made --

Signed and Sealed this seventeenth Day of February 1976

[SEAL]

Attest:

RUTH C. MASON
Attesting Officer

C. MARSHALL DANN
Commissioner of Patents and Trademarks